No. 897,698. PATENTED SEPT. 1, 1908.
S. P. A. ANDERSSON.
CHURN.
APPLICATION FILED JAN. 22, 1907.

2 SHEETS—SHEET 1.

Witnesses:
Gustave Browne.
Harry Thieme.

Inventor
Sven Peter Axel Andersson
by attorneys
Browne & Seward

No. 897,698. PATENTED SEPT. 1, 1908.
S. P. A. ANDERSSON.
CHURN.
APPLICATION FILED JAN. 22, 1907.
2 SHEETS—SHEET 2.
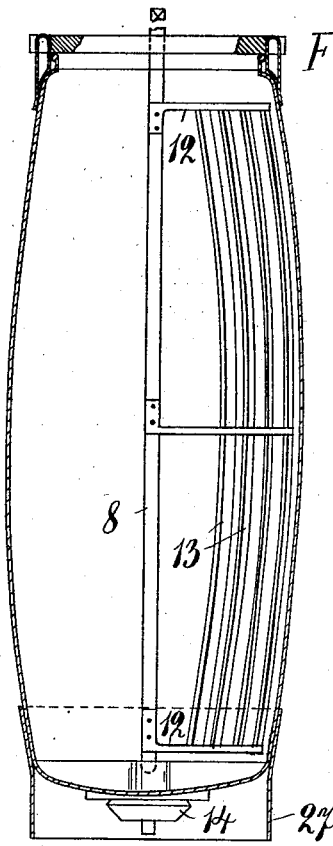
Fig. 5.
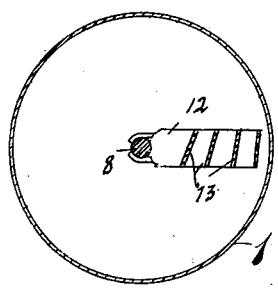
Fig. 7.
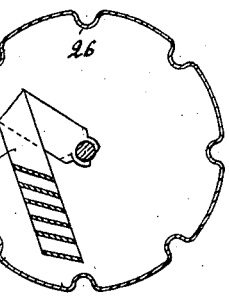
Fig. 8.
Fig. 9.
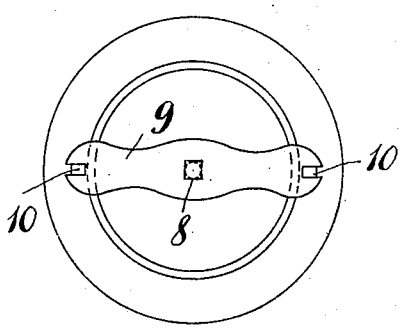
Fig. 6.
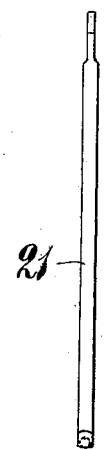
Witnesses:
Gustave Browne.
J Henry Thieme.
Inventor
Sven Petter Axel Andersson
by attorneys

UNITED STATES PATENT OFFICE.

SVEN PETTER AXEL ANDERSSON, OF STOCKHOLM, SWEDEN.

CHURN.

No. 897,698.  Specification of Letters Patent.  Patented Sept. 1, 1908.

Application filed January 22, 1907. Serial No. 353,422.

*To all whom it may concern:*

Be it known that I, SVEN PETTER AXEL ANDERSSON, a subject of the King of Sweden, and resident of Klara Södra Kyrkogata 11, Stockholm, in the Kingdom of Sweden, have invented certain new and useful Improvements in Churns, of which the following is a specification, reference being had therein to the accompanying drawings.

This invention refers to an arrangement in churns of that type in which the bowl, rotatably mounted in a suitable frame, is rotated by suitable means and in which one or more wings are located in the bowl which are commonly shaped as a grid and do not rotate, whereby the said wings on account of the resistance effected by them during the rotation of the bowl, produce a working of the cream, by which working the butter is formed. The said arrangement consists in providing the bowl in the shape of a pillar or tube in which the height of bowl is greater than its diameter, the bowl being located in the frame in such a manner that the bowl can easily be tilted round its horizontal transverse axis and thereby be emptied without being removed from the frame.

Hitherto the bowl has generally had a diameter approximately equal to the height of the same, which involves several disadvantages. During the rotation the liquid forms a wide, hollow cylinder of a great inner diameter. During the working much air is drawn into the cream mass by the said cylinder being filled with air, whereby the mass is made impure and changed into foam, and by this reason the preceding pasteurizing of the cream becomes of little use. Furthermore, the bowl is rotated with difficulty on account of the great effort produced by the resistance of the stationary wing against the liquid, dependent on the great distance of the wing from the center of the bowl. The said disadvantages are removed by this invention, as the bowl on account of its high and narrow shape does not permit the formation of any air pillar at the center of the bowl, and the bowl may also be easily rotated on account of the small diameter of the same.

Figure 1:
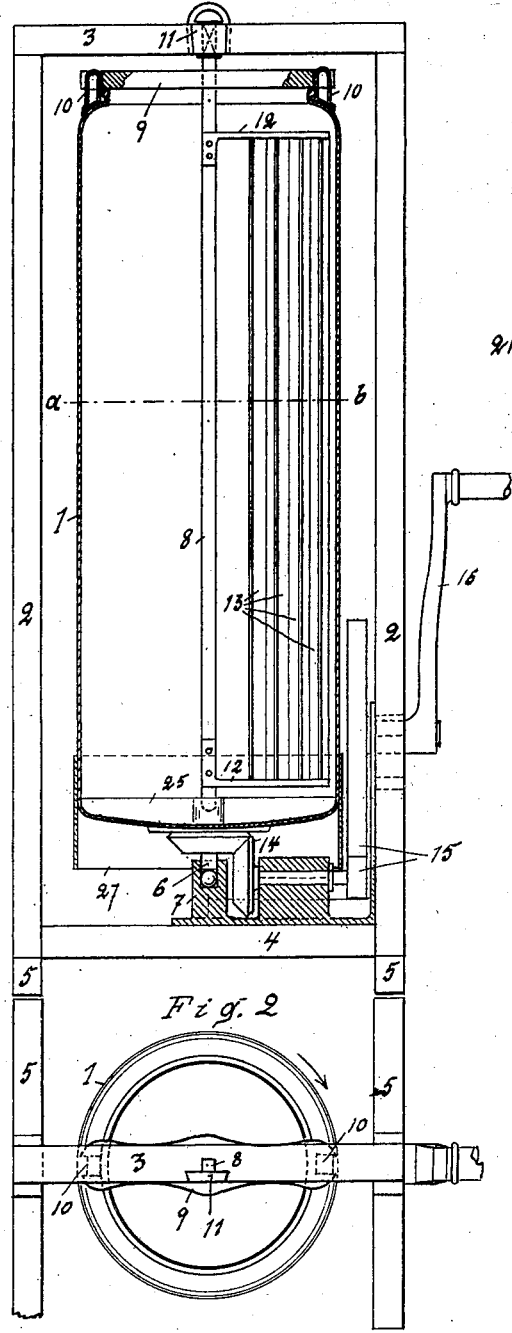
Figure 2:
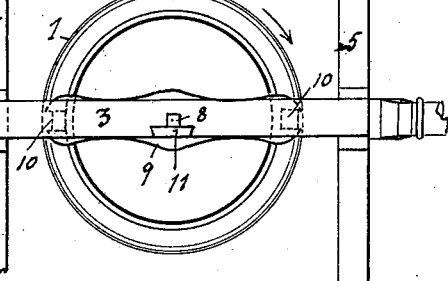
Figure 3:
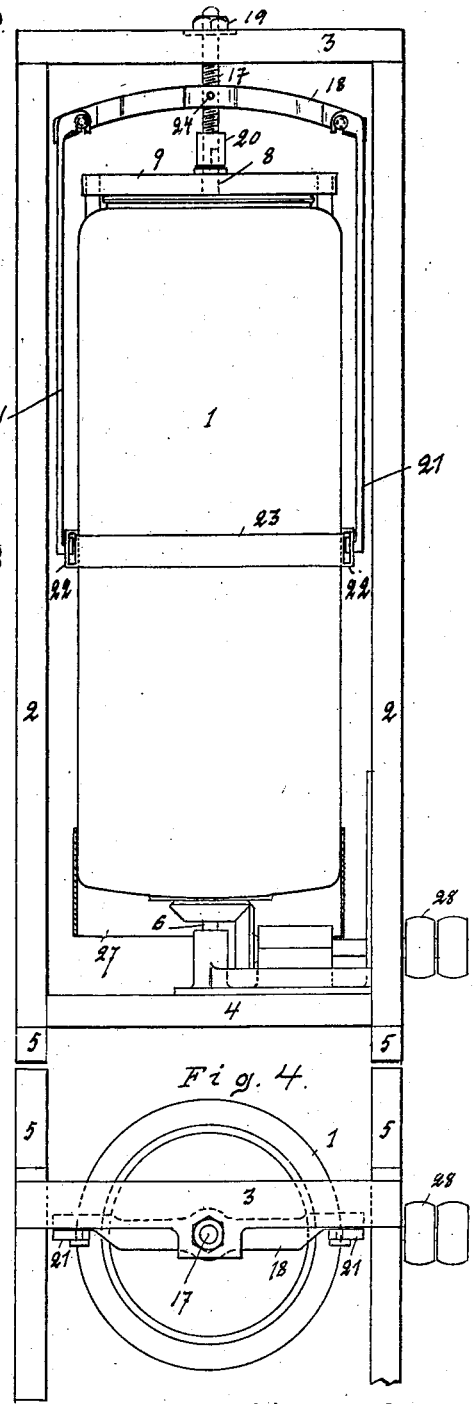
Figure 4:
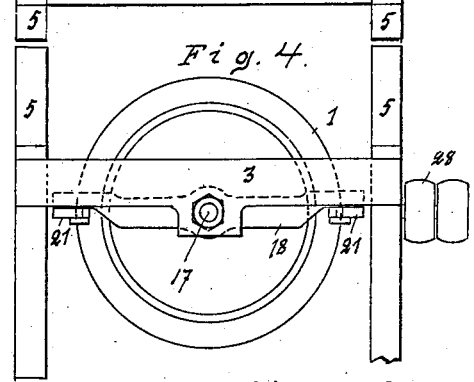

In the accompanying drawings Figure 1 is a vertical section and Fig. 2 a plan view of the churn. Figs. 3 and 4 are a front view and a plan view respectively of a churn, provided with means for tilting the bowl for the emptying of same, without the bowl being removed from the frame. Figs. 5 and 6 are a front view and a plan view respectively of a churn, the bowl of which has a somewhat bulgy shape instead of the cylindrical shape shown in Figs. 1 and 3. Fig. 7 is a horizontal section on the line *a—b* of Fig. 1. Fig. 8 shows a bowl the wall of which is corrugated for causing the cream to rotate with the bowl. The said figure also shows a modified arrangement of the grid. Fig. 9 is a detail.

The bowl 1 is journaled vertically in a rectangular frame, consisting of side pieces 2, 2, cross pieces 3, 4 and bottom pieces 5. The bowl 1 is provided at its bottom with a pivot 6 turning in a bearing 7 and is supported at its top end by the center vertical spindle 8, a cross piece 9 being loosely slid on the said spindle and fixed to the bowl in a detachable manner by means of ears 10, provided on the bowl and fitting in openings in the ends of the said cross piece. The said spindle 8 is mounted with its lower end in a bearing like part, provided in the bottom of the bowl 1 and its upper square end extends through a correspondingly shaped opening in the cross piece 3, from which it may be withdrawn by swinging the same laterally after the removal of the holding wedge 11. The said spindle 8 also carries the grid. The said grid, which has a plane shape, consists of arms 12, extending from the spindle, and of wide ribs 13, fixed between the said arms 12, said ribs being parallel to the axis of the bowl but transversally having an oblique position to the radius of the drum, Fig. 2, in such manner, that the ribs diverge in the rotary direction of the bowl, so that the fore edge of the ribs, with relation to the rotary direction of the bowl, is at a shorter distance from the said axis than the rear edge of the ribs.

In Figs. 1 and 2 the grid is located to its full extent in a plane containing the axis of the bowl but it may have any other position, as for instance the position shown in Fig. 8, in which the grid coincides with a chord of the bowl, which is effected by a special angular shape of the arms 12. For facilitating the cleaning of the grid the wings are slid into grooves or the like provided in the arms 12 in such manner, that they easily can be withdrawn. The bowl is rotated on the stationary spindle 8 by means of a bevel-gear 14, provided below the same, a gear 15 and a crank 16.

As shown in the drawings the cylindrical bowl has a very high and thin shape, so that it is suggestive of a tube. As a measure of the height it may be stated that it ought to be one and a half the diameter of the bowl at least. Before the bowl is put in motion, it is charged up to 80 per cent. of its volume. During the rotation of the bowl, which is effected in such a direction, that the cream passes through the grid in the same direction as the spaces between the ribs get wider, the whole liquid column rotates with the bowl without the liquid, due to the great height of the said column when compared with its width and to the great pressure vertically resulting therefrom, rising in the bowl in a degree worth mentioning. Consequently the cream will not run over the edge of the bowl, even if there is no cover on the bowl, as in the churns shown in the drawings. Together with the shape of the bowl the high, plane grid will aid in producing the said result, owing to the fact that the grid by the resistance exerted by the same causes the liquid to remain at the center of the bowl or prevents the liquid from assuming the shape of a hollow column, filled with air. Consequently the contact surface between the cream and the air is reduced to a minimum. The bowl of the churn described above having a diameter, which with relation to the volume is much smaller than in other rotating churns, the resistance, exerted by the grid, is less than in other churns, without the working action of the grid on the cream being reduced. On the contrary the said action is increased, as the liquid, moved the same distance, evidently, passes the grid more times in a bowl having a small diameter, than in a bowl with a great diameter.

The following means are provided for the tilting of the bowl, Figs. 3 and 4. The spindle 8 has at its top end an extension consisting of a screw spindle 17 extending through a cross piece 18 and through the cross piece 3 and a nut 19. The spindle 8 and the said screw 17 are connected in a reliable manner by the ends of the parts being notched, so that they engage each other and by a sleeve 20 being mounted on the said ends. The spindle 8 and screw 17 are disconnected by pushing the sleeve upward. Hooks 21, 21, hooked on the ends of the cross piece 18 and depending from the same, may be hooked to ears 22 on a hoop 23 or the like mounted on the bowl at the center of the same. The cross piece 18 is fixed to the screw by means of a pin 24 or the like inserted in openings in the cross piece and the screw. During the rotation of the bowl, the hooks are removed from the cross piece or are kept away from the bowl, the hooks being swung outward, sidewise, for that purpose, and suitably connected with the frame parts 2, 2. As the bowl is to be tilted, the hooks are hooked to the ears 22, 22. The bowl is then rotated slowly in such direction, that the screw, rotated by the same, is screwed upward in the cross piece 3, the bowl being thereby raised. As the bowl has been raised in the said manner to such a level, that its pivot 6 has left the bearing 7, it may be tilted in the fork, formed by the cross piece 18 and the hooks 21, 21. One of the hooks is shown in Fig. 9, viewed from another side than in Fig. 3. According to the drawings the hooks are so arranged, that they can be hooked on the cross piece, provided with small pins, and unhooked, but the hooks may, evidently, be fixed to the cross piece 18 in any other suitable manner.

At the bottom of the bowl wings 25 are provided, which cause the liquid to rotate with the bowl. The liquid column being high and thin, such wings or the like will act in the best manner as extend vertically along the bowl wall. Such wings are procured simply by bending the bowl wall inward into some folds 26, as shown in Fig. 8. The said wings or parts may be provided also in such manner, that the bowl wall is regularly corrugated in cross section or has some sharp folds, or in any other suitable manner. If the bowl is made of wood, as a cask, every other stave, for instance, may be thicker than the rest, the exceeding parts of the thicker staves being on the inner side of the bowl, forming projections on the said side.

The modification illustrated in Figs. 5 and 6 consists in the bowl having a somewhat bulgy shape, tapering toward both ends. In this case also the ribs of the grid may be bent in accordance with the shape of the bowl wall, as shown in Fig. 5. As in this case the length of the diameter of the bowl varies, as measure of the height of the bowl may be stated, that the said height should be at least one and a half the medium diameter of the bowl.

In order that the bowl, when removed from the frame, may rest steadily on the floor, it is provided at its bottom with a ring 27, forming a stand for the bowl. Owing to the said arrangement the bowl may be used as a tank, resting on the floor, in which the cream may be gathered. As stated above, the grid is stationary. However, it may be so arranged, that it can be rotated at the same time as the bowl is rotated. The gearing, provided for that purpose, acts on the rotating center spindle 8, provided with a pinion or the like. The motion transmitting device may be arranged in many other ways as for instance it may partly consist of a belt driving mechanism, as indicated in Figs. 3 and 4, showing belt pulleys 28.

Having now described my invention, what I claim as new and desire to secure by Letters Patent is:

1. In a churn, the combination of a bowl rotating about its vertical middle axis and having a high and narrow shape, a stationary dasher located in the bowl for working the cream, a frame, and means for pivoting the bowl to the frame in such a manner that the bowl may be emptied by rotating it round its horizontal transverse axis without being removed from the frame, substantially as described and for the purpose set forth.

2. In a churn, the combination of a bowl rotating about its vertical middle axis and having a high and narrow shape, a grid-like stationary dasher therein, a frame, a cross piece located above the bowl and provided with depending hooks for pivotally fastening the bowl to the frame, and means for raising the fastening device and the bowl in the frame into position to permit the bowl to be freely tilted, substantially as described and for the purpose set forth.

3. In a churn, the combination of a rotatable bowl having a high and narrow shape, a grid-like stationary dasher therein for working the cream, a frame, a hook-shaped device for fastening the bowl to the frame so as to be tilted when the bowl is to be emptied, and a screw for raising the said hook and thereby the bowl, in the frame to permit the bowl to be tilted, substantially as described and for the purpose set forth.

4. In a churn, the combination of a rotatable bowl having a high and narrow shape, a stationary dasher therein for working the cream, wings in the interior of the bowl, produced by depressions made in the wall of the bowl, a frame, and means for tiltably fastening the bowl to the frame, substantially as described and for the purpose set forth.

5. In a churn the combination of a bowl rotating about its vertical axis, the height of which bowl is one and a half the diameter of the bowl at least, a stationary dasher located therein and consisting of a plurality of wings disposed obliquely to the radius of the bowl, hooks depending on each side of the bowl from a cross piece, ears or the like provided on the bowl, in which the said hooks may be hooked, and a screw co-axial with the axis of the bowl and located in an upper cross piece of the frame, which screw, when caused to rotate with the bowl by the hooks hooked to the said ears, will raise the bowl in the frame by means of the hooks, so that it is brought out of engagement with a bottom bearing and can be tilted in the frame, substantially as described and shown in the accompanying drawings.

6. In a churn, the combination of a rotatable bowl having a high and narrow shape, a grid-like dasher located therein, and longitudinal wings or ribs in the interior of the bowl, produced by depressions made in the wall of the bowl, substantially as described and for the purpose set forth.

In witness whereof, I have hereunto signed my name in the presence of two subscribing witnesses.

SVEN PETTER AXEL ANDERSSON.

Witnesses:
HJALMAR JETTERSTROM,
ROBERT APELGREN.